(12) United States Patent
Wagner (10) Patent No.: US 7,168,729 B2
(45) Date of Patent: Jan. 30, 2007

(54) GAME CART/TREE STAND KIT

(76) Inventor: Michael R. Wagner, 7510 Stage Coach Rd., Dansville, NY (US) 14437

( * ) Notice: Subject to any disclaimer, the term of this patent is extended or adjusted under 35 U.S.C. 154(b) by 209 days.

(21) Appl. No.: 10/807,076

(22) Filed: Mar. 23, 2004

(65) Prior Publication Data

US 2005/0212232 A1    Sep. 29, 2005

(51) Int. Cl.
*B62B 1/00*    (2006.01)
(52) U.S. Cl. .................. 280/652; 280/30; 280/648; 280/640; 280/639
(58) Field of Classification Search ............... 280/652
See application file for complete search history.

(56) References Cited

U.S. PATENT DOCUMENTS

| | | | |
|---|---|---|---|
| 3,282,375 A | * | 11/1966 | Ray ........................ 182/16 |
| 4,321,982 A | | 3/1982 | Strickland |
| 5,282,520 A | | 2/1994 | Walker |
| 5,433,291 A | | 7/1995 | Shoestock, Sr. |
| 5,839,538 A | | 11/1998 | Magyar |
| 5,887,676 A | | 3/1999 | Harbin |
| 6,516,919 B1 | | 2/2003 | Sempel |
| 6,523,641 B2 | * | 2/2003 | Smith ........................ 182/63.1 |
| 6,561,529 B2 | | 5/2003 | Darling, III |
| 6,592,134 B2 | | 7/2003 | Abraham |

* cited by examiner

*Primary Examiner*—Christopher P. Ellis
*Assistant Examiner*—Cynthia F. Collado
(74) *Attorney, Agent, or Firm*—Jaeckle Fleischmann & Mugel, LLP (57) ABSTRACT

The tree stand/game cart kit of the present invention comprises a pair of bracket assemblies wherein the bracket assemblies further comprise a bracket portion, an axle segment and a wheel. Still furthermore, the tree stand/game cart kit of the present invention comprises a tow bar assembly further comprising a pair of brackets for attaching to a wide variety of ladders or tree stands.

18 Claims, 8 Drawing Sheets

GAME CART/TREE STAND KIT

TECHNICAL FIELD

The present invention relates to a game cart kit, and more particularly to a game cart kit adaptable to fit a wide variety of tree stands or ladders.

BACKGROUND OF THE INVENTION

Hunting is a very popular sport throughout the United States and the world. Generally, those participating in this sport are required to transport a fair amount of gear from one point to another, often over rugged terrain. Hunters may opt to either carry the gear in a backpack, or haul said gear on what is know in the field as a game cart. Additionally, a game cart is typically required for transporting game animals from the field, back to their car/vehicle.

Furthermore, a typical method of hunting requires a hunter to choose a relatively isolated location in the woods, and quietly wait in said location for game. The hunter may utilize a tree stand to climb a tree and wait for the game. A tree stand is advantageous because it offers the hunter a higher vantage point from which to view the field, and having the hunter elevated above the ground prohibits the deer from picking up the hunter's scent. Additionally, because the hunter may be required to wait in such a position for a prolonged period of time, a seat is also part of the tree stand. While typically, transporting tree stands from one place to another is difficult, tree stands that are easily disassembled have been developed.

Currently, several combination tree stand and game carts are known. An example of such a device is disclosed in Combination Tree Stand And Game CART, described in U.S. Pat. No. 6,516,919. The device provides a platform having a frame with two sets of parallel frame members forming a generally rectangular shape. The frame has cross braces and a pair of wheel brackets, one on each side of the frame, for pivotally connecting leg members to the frame. Additionally, the leg members have a wheel axle extending there between. While the device provides both a tree stand and a cart, the device is not adaptable to accept a wide variety of tree stands, and the operator is limited to the tree as provided, because the wheel brackets are fixedly mounted to the ladder frame.

An example of an adaptable game cart is disclosed in Versatile Portable Cart, described in U.S. Pat. No. 6,561,529. The device discloses axle members received within each hole, of each lower portion of each vertical strut. To accommodate frames or cargo of varying widths, the distance between vertical struts can be varied along the axle length by loosening and tightening the tightening member and moving vertical struts laterally apart or towards each other along axle members. A one-piece axle may be used, as well as a pair of axle members, held in opposite axial orientation by straight rigid axle connector. Because of the axle configuration required on this device, the operator is limited by both axle and straight rigid axle connector length when attaching the struts to the frames to be hauled.

Additionally, because of the distances that need to be traversed it is important that a cart be adaptable to be hauled by an ATV. Therefore it is important that a game cart further comprise a tow bar, so that it may be attached to an ATV, and hauled over rugged terrain as needed.

Carts having tow bars are known. One such example is disclosed in the Versatile Portable Cart, described in U.S. Pat. No. 6,561,529. The example illustrated discloses a cart adapted to be attached to a bicycle. Further disclosed is a bicycle seat-stem compression clamp, formed of a body portion, and plate, fastened by screws. The device has a bore angled so that the clamp remains perpendicular when installed on a typical bicycle seat-stem. While the aforementioned device serves to attach a cart to a bicycle, it requires many components, and a fair amount of assembly.

Therefore, what is needed in the art is a kit that will convert a wide variety of readily available ladders or tree stands in to carts, suitable for transporting game or any other suitable items.

Furthermore, what is needed in the art is kit for converting such wide variety of ladders or tree stands into carts, having a tow bar capable of attaching to an ATV or similar device.

SUMMARY OF THE INVENTION

In order to overcome the above stated problems, the present invention provides a combination tree stand/game cart kit that converts a wide variety of tree stands into game carts. Furthermore, the tree stand/game cart kit of the present invention comprises a pair of bracket assemblies wherein the bracket assemblies further comprise a bracket portion, an axle segment, and a wheel. Still furthermore, the tree stand/game cart kit of the present invention comprises a tow bar assembly. The tow bar assembly further comprises a pair of brackets for attaching to a wide variety of ladders, or tree stands. Still furthermore, the tow bar assembly of the present invention comprises a pair of tow bar clamps for further securing the tow bar assembly to the ladder or tree stand, and a tow opening to allow the tow bar to be attached to a vehicle, such as, for example, an ATV.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

DETAILED DESCRIPTION OF THE INVENTION

Figure 1:
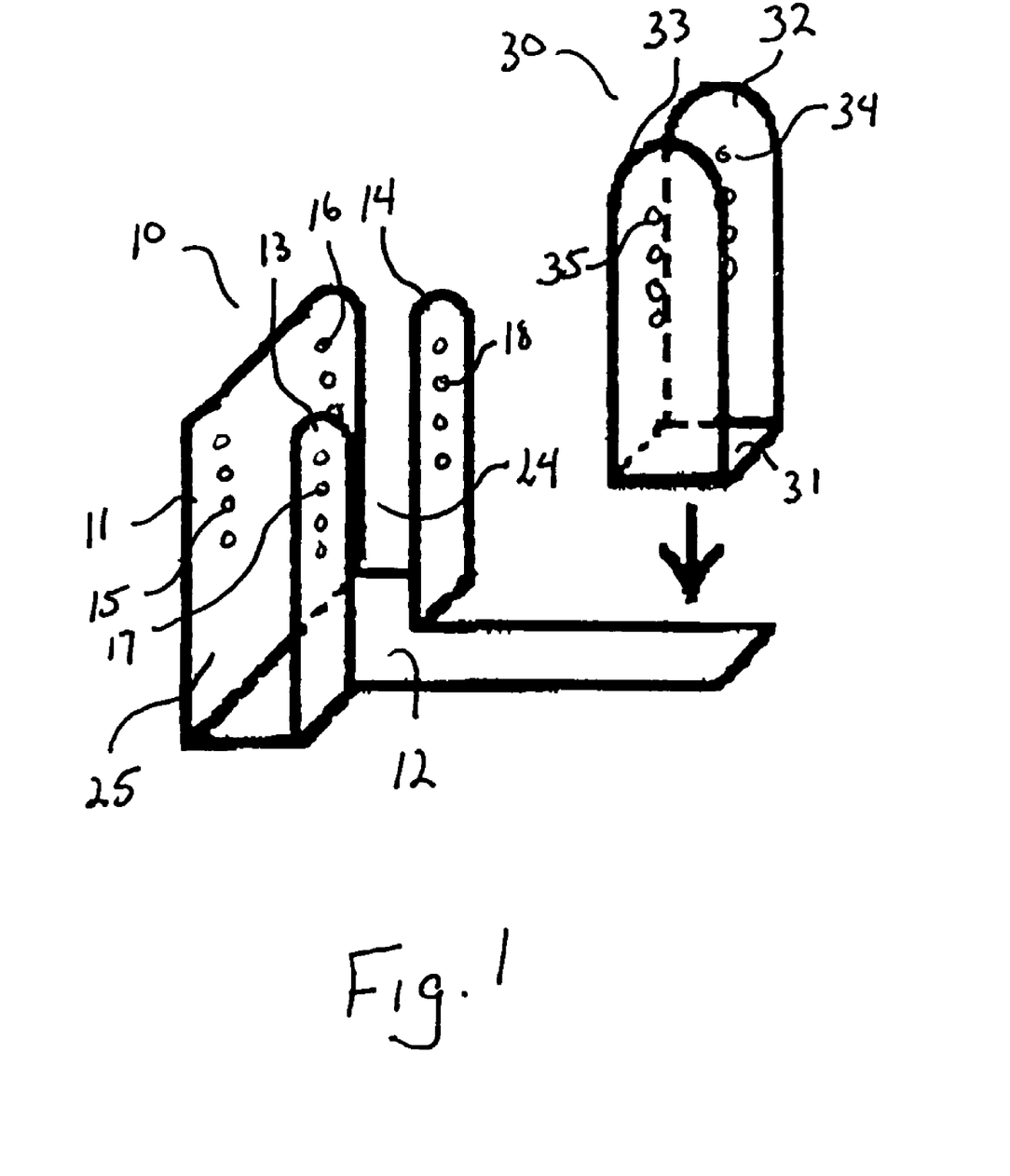
FIG. 1 is an isometric view of the game cart kit bracket of the present invention.

Referring to FIG. 1, an isometric view of the game cart bracket assembly 10 of the present is shown. The bracket assembly 10 is formed from a single piece of sheet metal, however any other suitable type of material may be used. The bracket further comprises a plurality of wall members extending upward therefrom. The wall members of the bracket 10 further comprise a peripheral wall member 11 and a pair of central wall members 13 and 14 respectively.

The peripheral wall member 11 extends upward, substantially perpendicular to the base member 12, and said pair of central wall members 13 and 14 extend upward, substantially perpendicular to said base member 12. Furthermore, the peripheral wall member 11 is substantially parallel to each of the central wall members 13 and 14, and is separated from each of the central wall members 13 and 14 by a distance 25, wherein said distance 25 is a sufficient distance to adequately allow the ladder upright segments of a variety of standard tree stands to fit there between. Furthermore, the distance 24 between said the central wall members 13 and 14, is a sufficient distance to allow a wide variety of rungs to fit there between.

Figure 2:
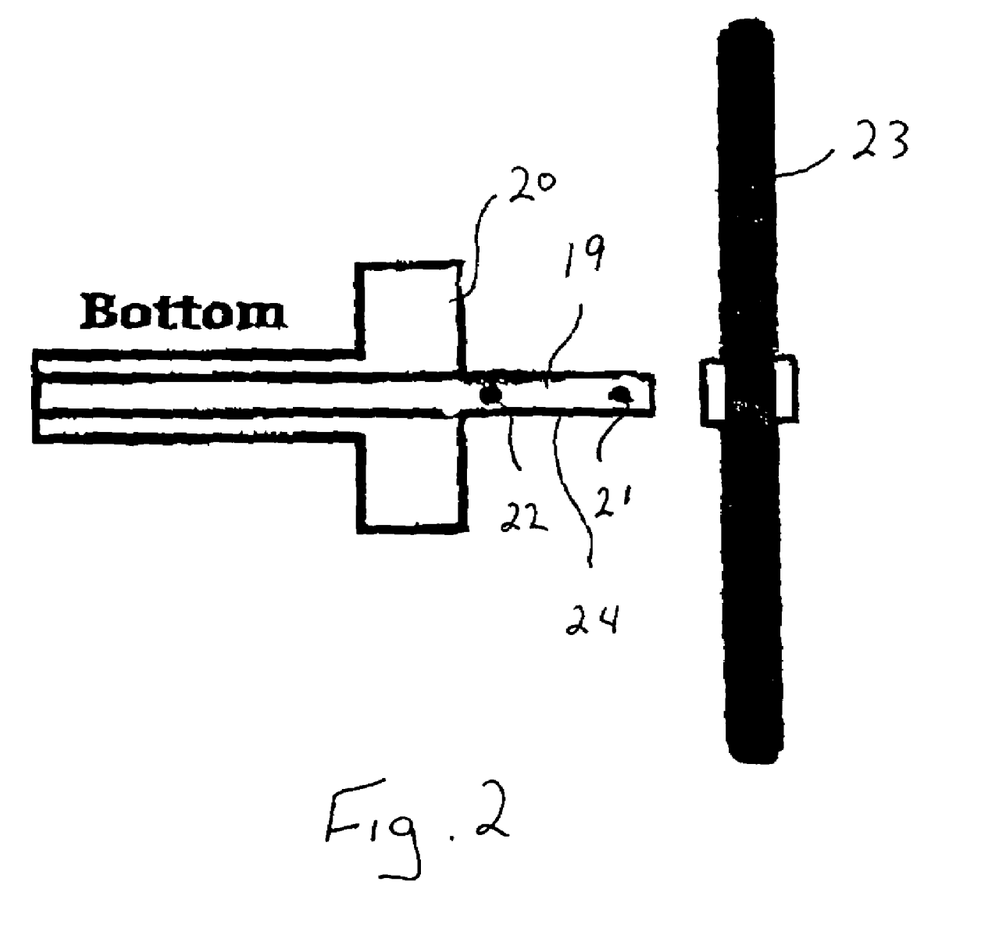
FIG. 2 is a bottom view of the game cart kit bracket of the present invention, wheel and axle assembly.
Figure 3:
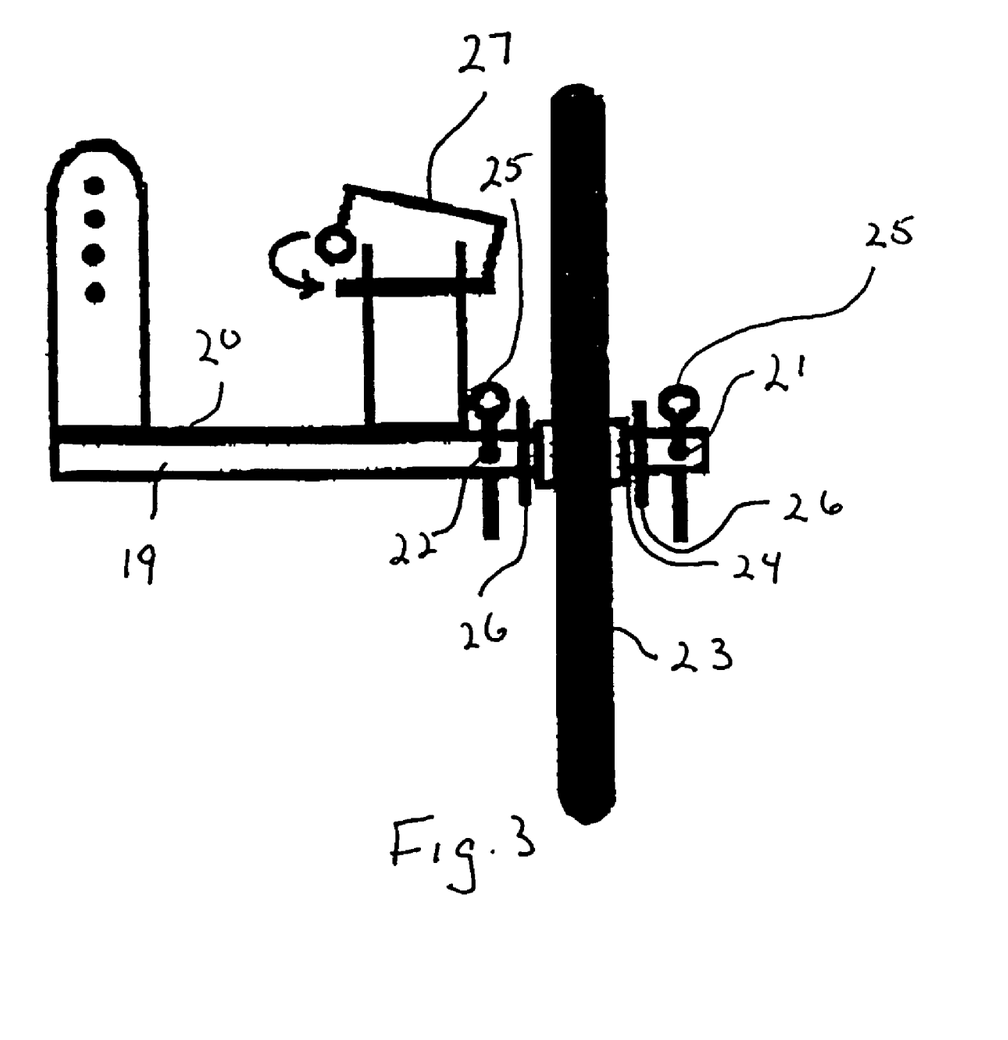
FIG. 3 is a side view of the game cart kit bracket of the present invention attached to wheel and axle assembly

Referring now to FIG. 2 and FIG. 3, a bottom view of the bracket assembly 10, and the assembled bracket 10 and wheel assembly 23 are shown. The bottom surface 20 of the bracket assembly 10 further comprises an axle segment 19 fixedly attached thereto. The axle segment 19 may be fixedly attached to the bottom surface 20 of the bracket assembly 10 by any suitable means, such as, for example welding. The axle segment further comprises an outer portion 24 for engaging a wheel assembly 23. The outer portion 24 of the axle segment 19 further comprises a pair of bores 21 and 22. The bores 21 and 22 are each adapted to receive a cotter key 25. The cotter key 25 is inserted into the bores 21 and 22 thereby providing a stop or a means for impeding the wheel assembly 23 from moving along said axle. While the preferred embodiment of the present particularly utilizes cotter keys 25 for this function, any suitable apparatus for providing a stop on the axle segment 19 may be used.

Referring again to FIG. 3, the assembled bracket and wheel assembly is shown. The apparatus comprises the bracket with axle segment and the wheel, the cotter keys 25 and a pair of washers 26. In order to assembly the kit a cotter key is fastened through the bore 22 on the axle segment 19. Once the cotter key is in place a first washer is inserted on the axle segment thereby providing a first stop. Once the cotter key 25 and first washer is in place to form the first stop, the wheel assembly 23 is inserted on the axle segment. With the wheel assembly inserted on the axle segment and against the first stop, the second washer is inserted on the axle segment and should be moved into communication with the wheel assembly. Finally, the second cotter key 25 is fastened into the outer bore 21 to thereby provide a second stop wherein the wheel assembly 23 may rotate about the axle segment 19, however movement along the axle segment 19 is prohibited by the first and second stop. Generally, in order to form a cart from a tree stand or ladder, a pair of the aforementioned bracket and wheel assemblies are attached to the tree stand, or ladder at opposing sides.

Referring again to FIG. 1, the bracket assembly 10 further comprises a peripheral wall member 11 which extends upward, substantially perpendicular to the base member 12, and said pair of central wall members 13 and 14 each have a plurality of bores. The peripheral wall member 11 comprises a first group of bores 15 and a second group of bores 16, the first central wall has a first central wall plurality of holes 17, and the second central wall has a second central wall plurality of bores 18. The plurality of holes in the peripheral wall 15 and 16 align with the plurality of holes on the central walls 17 and 18 respectively, wherein a quick pin 27 or suitable device can be utilized to secure the ladder or tree stand to the bracket kit assembly. The bores in the walls vary in distance from the base member, so that a wide variety of rungs of varying widths can be mounted to said bracket. Furthermore, such a configuration serves to accommodate a varying number of tree stand/ladder segments.

Figure 4:
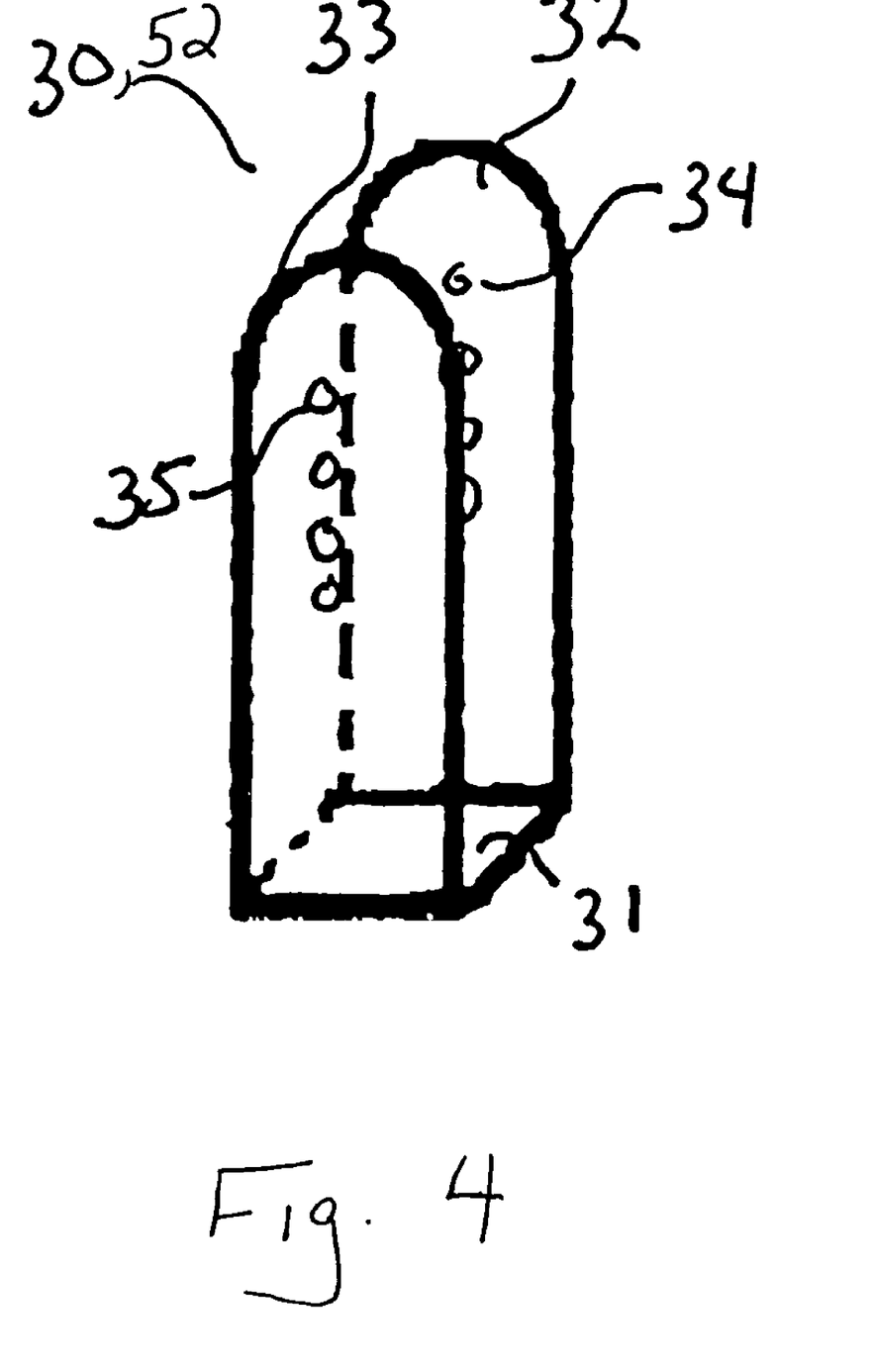
FIG. 4 is an isometric view of the clamp of the present invention

Referring now to FIG. 1 and FIG. 4, an additional clamp 30 for securing the rungs of a ladder to the bracket is shown. Generally the clamp 30 comprises a base section 31 and two additional parallel wall sections 32 and 33, wherein each of said parallel wall sections 32 and 33 has a plurality of opposing bores 34 and 35. In operation the base 31 of this clamp 30 is secured to the base section 12 of the aforementioned bracket kit 10. The two bases 12 and 31 may be secured together by welding or by an appropriate means that will fixedly attach the bracket 10 and clamp 30.

Figure 5:
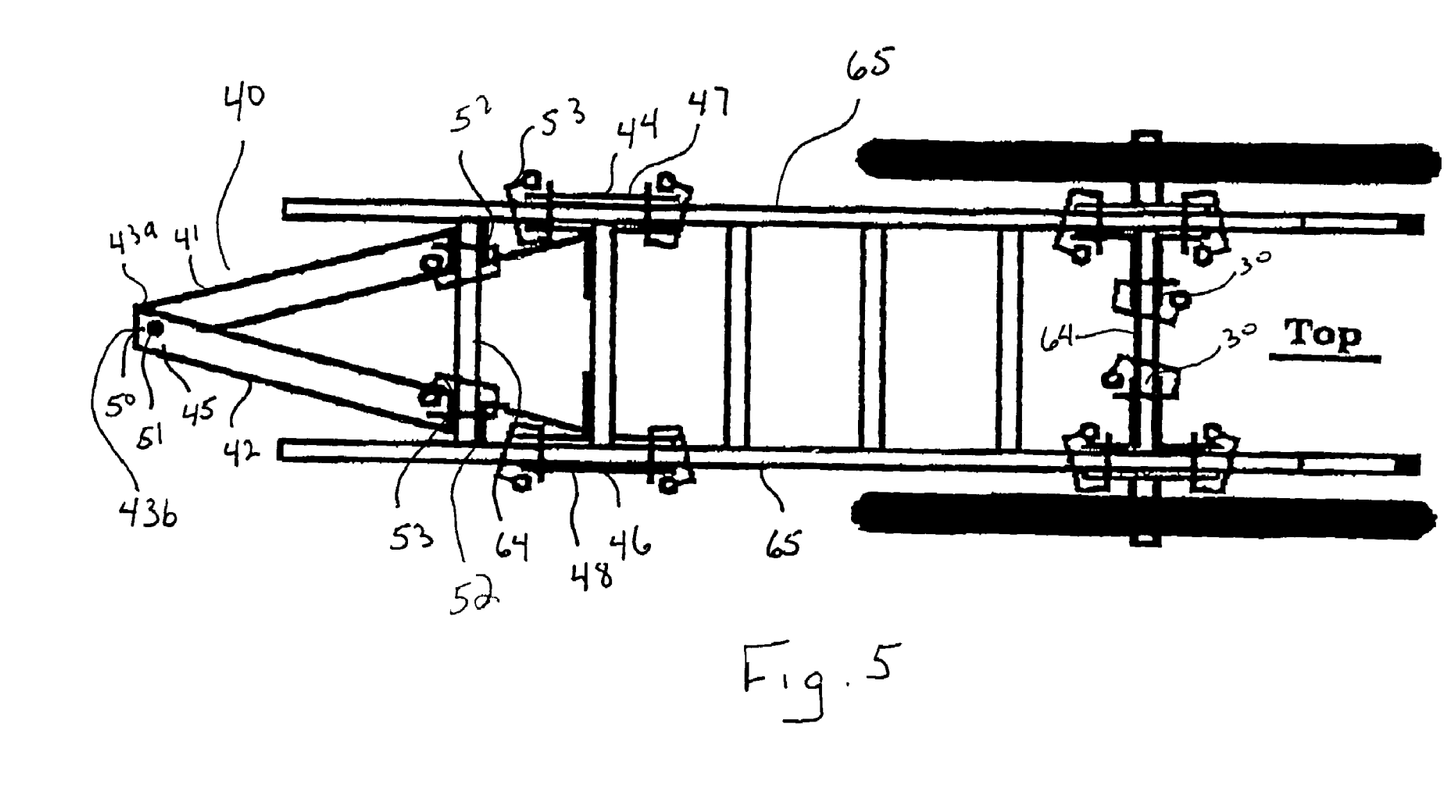
FIG. 5 is a top view of the tow bar assembly and bracket assembly attached to a plurality of ladder segments.
Figure 6A:
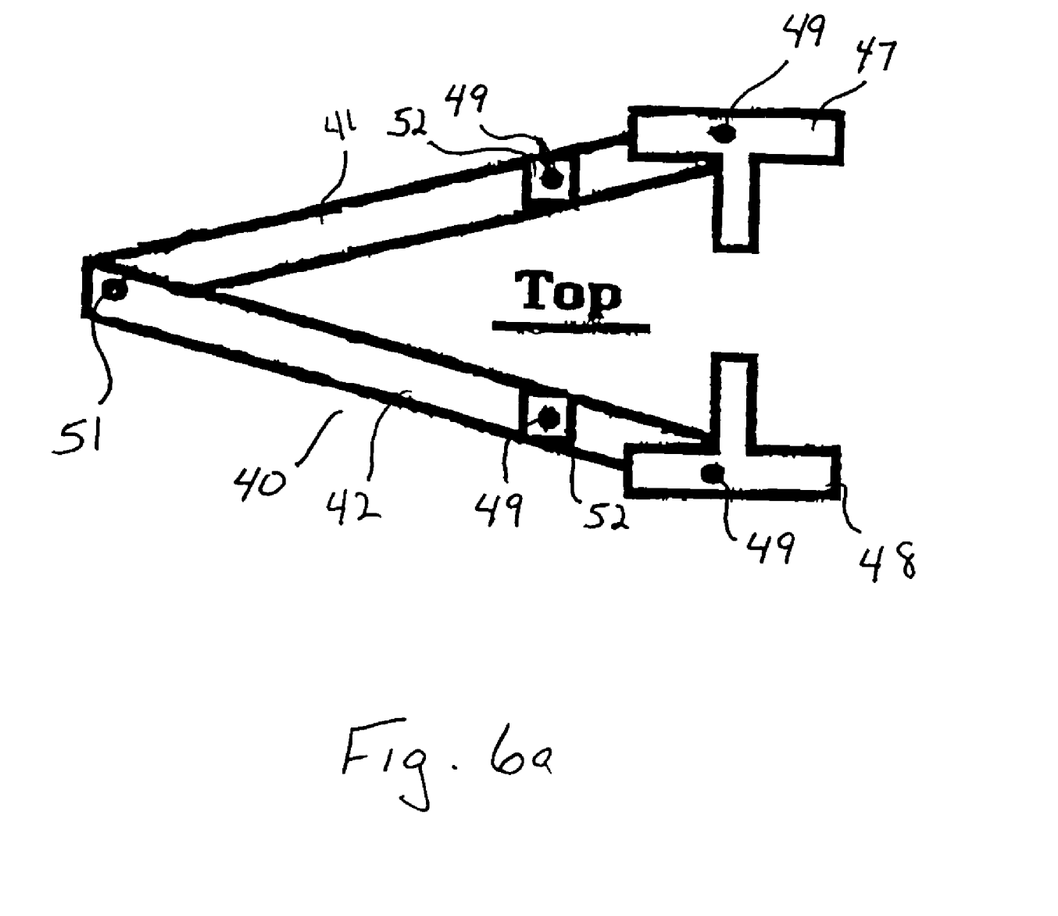
FIGS. 6a and 6b are respective top and bottom views of the tow bar assembly of the present invention.
Figure 6B:
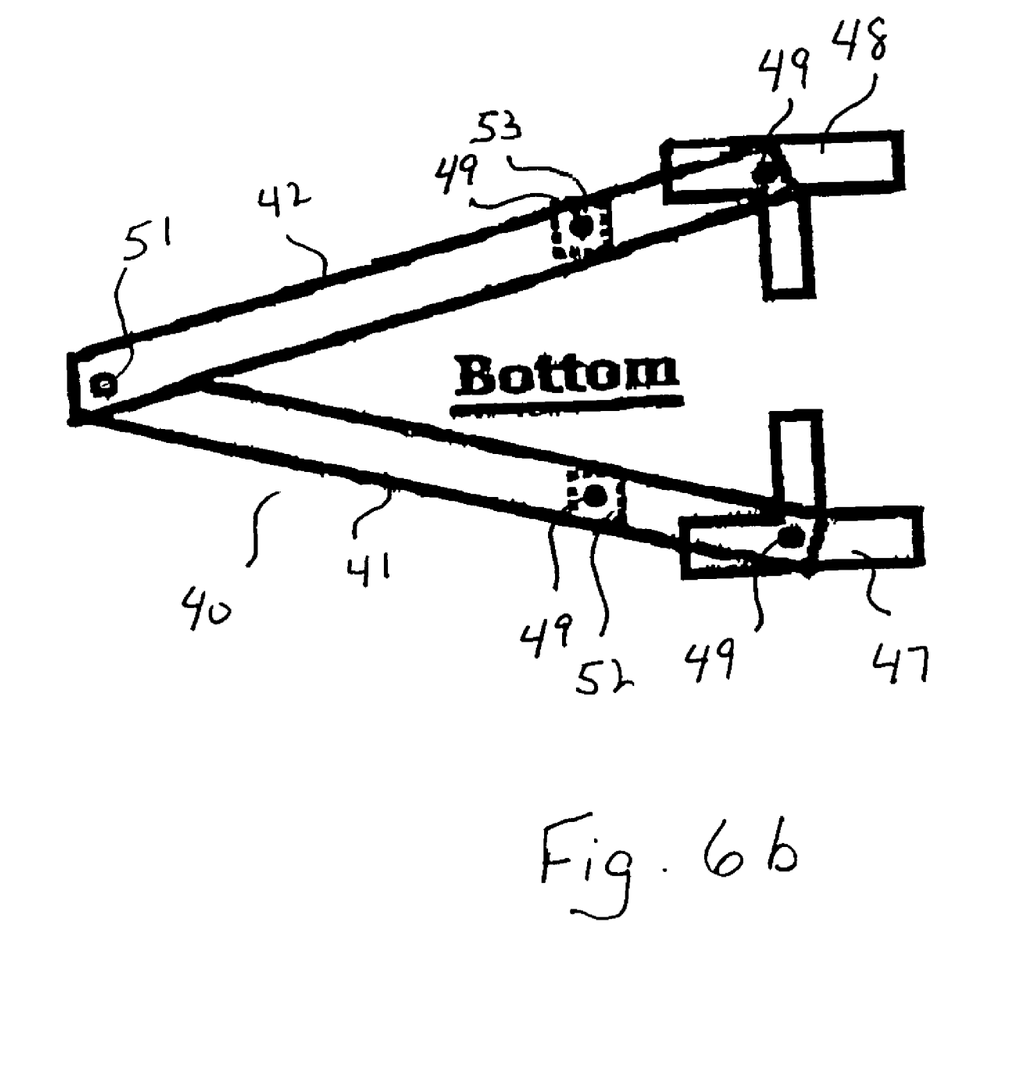

Referring now to FIGS. 5, 6a and 6b, views of the tow bar assembly of the present invention are shown. The tow bar assembly 40 comprises a pair of elongated bar segments 41 and 42. Each of said elongated bar segments 41 and 42 further comprise a tow end 43a and 43b respectively and a distal end 44 and 46 respectively. Attached to each of said distal ends 44 and 46 is a tow bar bracket assembly 47 and 48 respectively, wherein each of said tow bar bracket assemblies 47 and 48 are substantially similar to the bracket 10 in FIG. 1. The tow bar bracket assemblies 47 and 48 are fixedly attached to the respective distal ends 44 and 46 of the elongated bar segments 41 and 42 by a nut and bolt combination 49, or by any appropriate means. Furthermore, the tow ends 43a and 43b of the respective elongated bar segments 41 and 42 intersect at a junction 50. While in a particular embodiment of the present invention the elongated bar segments 41 and 42 are formed from a single bar, two separate bars fixedly attached together at a junction 50 is within the scope of the invention as well. Furthermore, the tow ends 43a and 43b of the respective elongated bar segments 41 and 42, pivot relative to each other, thereby allow the tow bar bracket assemblies 47 and 48 of the distal ends 44 and 46 to be separated by an appropriate distance to accommodate a wide variety of tree stand or ladder segments.

Additionally, the assembly further comprises a tow opening 51, wherein said tow opening 51 is formed via adjacent circular bores in each of said tow ends 43a and 43b of the respective elongated bar sections 41 and 42.

A tow bar clamp 52 is attached to each of said elongated tow bars 41 and 42 to further serve to secure the tow bar assembly 40 to the ladder segments. The tow bar clamp 52 is substantially similar to the clamp 30 as illustrated in FIG. 4. Furthermore, the tow bar clamps 52 are attached to each of said elongated tow bars 41 and 42 by a nut and bolt combination 49, or by any appropriate means. In a particular embodiment of the present invention the tow bar clamp 52 are mounted to said elongated bars 41 and 42 whereby the tow bar clamps 52 may rotate relative to said elongated tow bars 41 and 42. As illustrated in FIG. 4 the clamp comprises a base section 31 and two additional parallel wall sections 32 and 33, wherein each of said parallel wall sections 32 and 33 has a plurality of opposing bores 34 and 35. As in the clamp assembly illustrated in FIG. 1, a pair of tow bar clamp fastening means 53 are inserted into the respective opposing bores 34 and 35 thereby serving to further secure the ladder segments to the tow bar clamp assemblies 52.

Referring now to FIG. 7 and again to FIG. 5, respective side and top views of the tow bar assembly 40 and bracket assembly 10 attached to the tree stand/ladder segments 61, 62 and 63 are shown. In a particular embodiment of the present invention, the tree stand/ladder segments 61, 62 and 63 serve to comprise a hunting tree stand when assembled, however any tree stand/ladder segment or number of tree stand/ladder segments would be within the scope of the invention.

Figure 7:
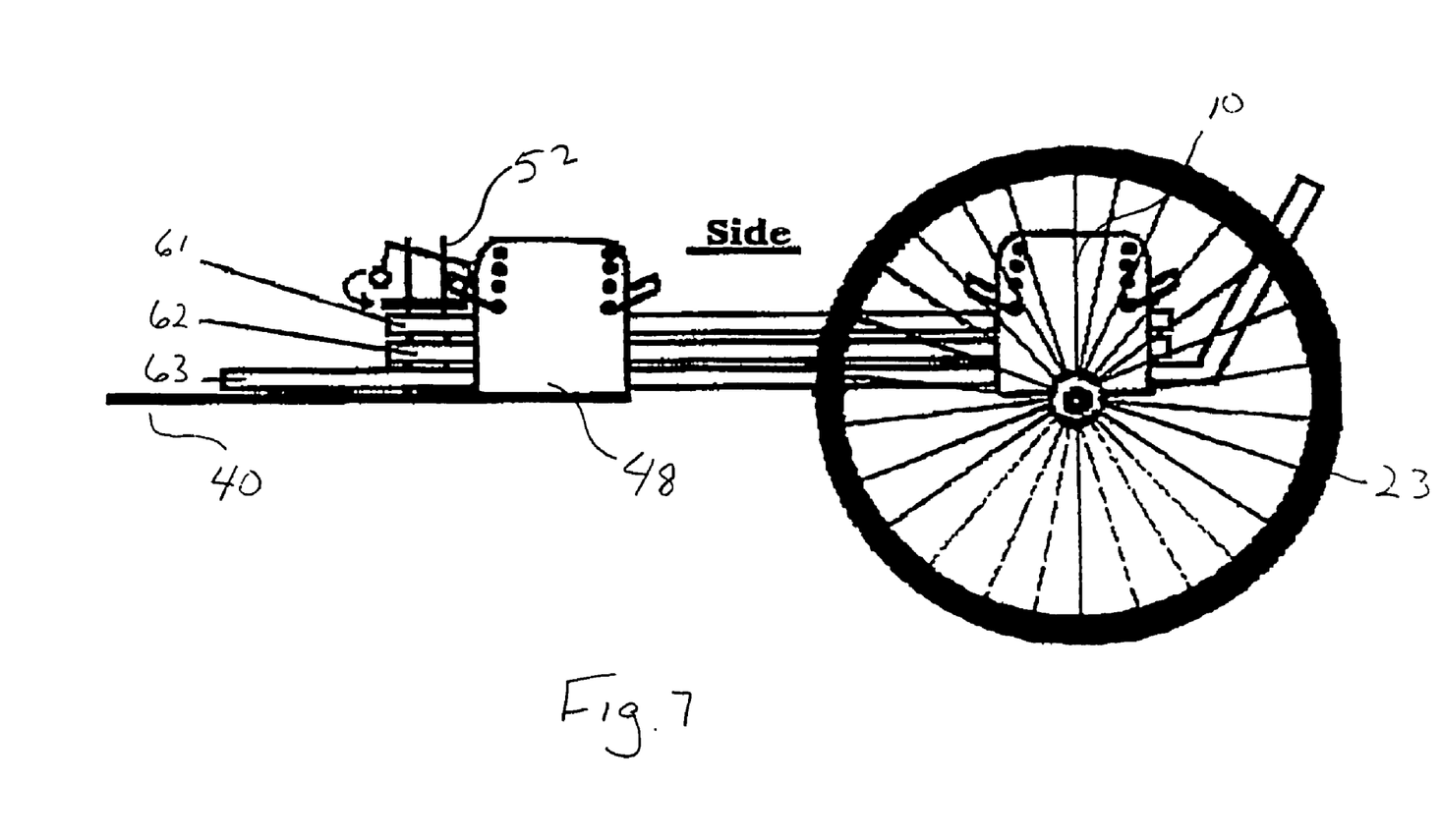
FIG. 7 is a side view of the tow bar assembly and bracket assembly attached to a plurality of ladder segments.

The tree stand/ladder segments 61, 62 and 63 of the present invention further comprise a pair of tree stand/ladder upright segments 65 and a plurality of rungs 64. As illustrated the pair of tow bar clamps, and the clamp portions 30 of the bracket assemblies 10 serve to secure the rungs 64 of the tree stand/ladder segments 61, 62, and 63 to their respective assemblies 40 and 10. More particularly, the rungs 64 are attached to the respective assemblies 40 and 10 by placing the rungs 64 between parallel wall sections 32 and 33 of the clamps 30 and 52 until engaged with the base section 31, or a previously inserted tree stand/ladder segment. When the desired number of tree stand/ladder segments are in place, the clamps 30 are secured to the ladder rungs 64 by inserting a clamp fastening means 53 through an appropriate opposing pair of said plurality of opposing bores 34 and 35.

The tow bar bracket assemblies 47 and 48 and the bracket assembly 10 are attached to the tree stand/ladder upright segments 65 by inserting said tree stand/ladder upright segments 65 between the peripheral wall member 11 and the pair of central wall members 13 and 14. More particularly, tree stand/ladder upright segments 65 are attached to the respective assemblies 47, 48 and 10, by placing the tree stand/ladder upright segments 65 between the peripheral wall member 11 and the pair of central wall members 13 and 14 of the respective assemblies 47, 48 and 10, until engaged with the base section 12, or a previously inserted tree stand/ladder segment. When the appropriate number of tree stand/ladder segments are in place, tow bar bracket assemblies 47 and 48 and the bracket assemblies 10 are secured to the tree stand/ladder upright segments 65 by inserting a clamp fastening means 53 through an appropriate opposing pair of said plurality of opposing bores 34 and 35.

The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

I claim:

1. A game cart kit comprising a first wheel bracket assembly and a second wheel bracket assembly, and a tow bar assembly, wherein said first and second wheel bracket assemblies each comprises a bracket, an axle segment, and a wheel, each said bracket further comprising a base section and a plurality of wall members extending upward therefrom, wherein said wall members further comprise a peripheral wall member and a pair of central wall members, said peripheral wall member extending upward, substantially perpendicular to said base member, and said pair of central wall members extending upward, substantially perpendicular to said base member.

2. The game cart kit of claim 1 wherein said peripheral wall member further comprises a first set of peripheral wall holes and a second set of peripheral wall holes, and said pair of said central wall members each comprise a set of central wall holes.

3. The game cart kit of claim 1 wherein each said bracket further comprises an upper surface and a lower surface, said upper surface being adapted to receive at least one ladder segment, and said lower surface further comprising an axle segment fixedly attached thereto.

4. The game cart kit of claim 3 wherein said axle segment further comprises a first end and a second end, and wherein said first end of said axle segment is adjacent to the side of the bracket contiguous with said peripheral wall member, and said second end extends outward from said bottom side of said bracket, substantially perpendicular to said wall members.

5. The game cart kit of claim 4 wherein said axle segment further comprises a pair of bores there through, wherein said pair of bores are separated by a distance sufficient to accommodate a hub of a wheel there between.

6. The game cart kit of claim 5 wherein said hub of said wheel is secured to said axle segment by inserting a first locking means through said first bore in said axle segment and inserting a second locking means through said second bore of said axle segment.

7. The game cart kit of claim 6 wherein said first locking means and said second locking means each further comprises a pair of cotter pins.

8. The game cart kit of claim 3, wherein said at least one ladder segment further comprises a tree stand.

9. The game cart kit of claim 1, wherein said tow bar assembly further comprises a pair of elongated bar segments, a pair of tow bar bracket assemblies, and a pair of tow bar clamps.

10. The game cart kit of claim 9 wherein said pair of elongated bar segments each comprise a distal end for mounting one of said pair of tow bar bracket assemblies, and tow end for coupling said pair of elongated bar segments to each other.

11. The game cart kit of claim 10 wherein each of said elongated bar segments further comprises a through hole wherein said through holes of each of said elongated bar segments are adjacent to each other and thereby form a single bore between said pair of elongated bar segments.

12. The game cart kit of claim 9 wherein one of said pair of tow bar clamps is attached to a respective one of said pair of elongated bar segments, wherein each of said one of said pair of tow bar clamps is between said distal end and said tow end.

13. The game cart kit of claim 9 wherein each one of said pair of tow bar bracket assemblies is adapted to receive an upright ladder segment, and each one of said pair of tow bar clamps is adapted to receive a ladder rung.

14. The game cart kit of claim 13 wherein said each one of said pair of tow bar bracket assemblies further comprises a tow bar bracket locking means for securing said upright ladder segment to said each one of said pair of tow bar bracket assemblies.

15. The game cart kit of claim 14 wherein said tow bar bracket locking means further comprises a quick pin and plurality of through holes.

16. The game cart kit of claim 13 wherein said each one of said pair of tow bar clamps further comprises a tow bar clamp locking means for securing said ladder rung to said each one of said pair of tow bar clamps.

17. The game cart kit of claim 16 wherein said tow bar clamp locking means further comprises a quick pin and plurality of through holes.

18. The game cart kit of claim 9 wherein said pair of elongated bar segments are pivotally attached to each other so that the relative positions of said pair of tow bar bracket assemblies and said pair of said tow bar clamps are adaptable to secure ladder assemblies of varying sizes.

* * * * *